(12) United States Patent
Goto

(10) Patent No.: US 12,089,048 B2
(45) Date of Patent: Sep. 10, 2024

(54) IN-VEHICLE SYSTEM INCLUDING ABNORMALITY DETECTION UNIT CONFIGURED TO RECOGNIZE LOWER LEVER CONTROL UNIT AS UNAUTHORIZED BY MONITORING PLURALITY OF ELEMENTS OF LOWER LEVEL CONTROL UNIT

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 245 days.

(21) Appl. No.: 17/710,968

(22) Filed: Mar. 31, 2022

(65) Prior Publication Data

US 2022/0330025 A1    Oct. 13, 2022

(30) Foreign Application Priority Data

Apr. 7, 2021 (JP) ................................. 2021-065462

(51) Int. Cl.
| | |
|---|---|
| H04W 12/12 | (2021.01) |
| B60R 16/023 | (2006.01) |
| B60W 50/02 | (2012.01) |
| H04W 12/122 | (2021.01) |

(52) U.S. Cl.
CPC ....... *H04W 12/122* (2021.01); *B60R 16/0232* (2013.01); *B60W 50/0225* (2013.01)

(58) Field of Classification Search
CPC ............ H04W 12/122; B60R 16/0232; B60W 50/0225
USPC ........................................................ 701/29.2
See application file for complete search history.

(56) References Cited

U.S. PATENT DOCUMENTS

| | | | |
|---|---|---|---|
| 2020/0137099 A1 | 4/2020 | Haga et al. | |
| 2020/0145437 A1 | 5/2020 | Torisaki et al. | |
| 2020/0216097 A1 | 7/2020 | Galula et al. | |
| 2021/0349977 A1* | 11/2021 | Kishikawa | B60W 40/09 |
| 2021/0399942 A1* | 12/2021 | Yasunori | B60R 16/0232 |

FOREIGN PATENT DOCUMENTS

| | | |
|---|---|---|
| JP | 2019-22210 A | 2/2019 |
| WO | 2020/066693 A1 | 4/2020 |
| WO | 2021/039523 A1 | 3/2021 |

* cited by examiner

*Primary Examiner* — Mahmoud S Ismail
(74) *Attorney, Agent, or Firm* — Kenealy Vaidya LLP

(57) ABSTRACT

An in-vehicle system includes a zone control unit and lower-level control units. The zone control unit includes: a power supply control unit configured to control power supply to each of the lower-level control units; a communication control unit configured to control communication with each of the lower-level control units; and an abnormality detection unit configured to detect presence or absence of an abnormality in each of the lower-level control units. In a case in which an abnormality for two or more of elements including a power supply current value, a communication response time, and a MAC address is detected in at least one of the lower-level control units, the abnormality detection unit is configured to recognize that the at least one of the lower-level control units is an unauthorized device.

5 Claims, 5 Drawing Sheets

IN-VEHICLE SYSTEM INCLUDING ABNORMALITY DETECTION UNIT CONFIGURED TO RECOGNIZE LOWER LEVER CONTROL UNIT AS UNAUTHORIZED BY MONITORING PLURALITY OF ELEMENTS OF LOWER LEVEL CONTROL UNIT

CROSS-REFERENCE TO RELATED APPLICATIONS

This application is based on and claims the benefit of priority of Japanese Patent Application No. 2021-065462 filed on Apr. 7, 2021, the entire contents of which are incorporated herein by reference.

FIELD

The present disclosure relates to an in-vehicle system, and particularly to a technique for security measures.

BACKGROUND

An in-vehicle system may be attacked by unauthorized communication from devices outside a vehicle, for example, via the Internet. Any one of a plurality of electronic control units (ECUs) on the vehicle may be replaced with an unauthorized device, or an unauthorized device may be directly connected to an in-vehicle communication network. In that case, an attack by an unauthorized device occurs on the in-vehicle communication network. Therefore, it is necessary to protect operation of the in-vehicle system and ensure safety of the vehicle against the attack by communication of the unauthorized device.

For example, JP-A-2019-022210 discloses an in-vehicle relay device that stops unauthorized control from an in-vehicle device that was attacked. That is, the in-vehicle relay device that relays transmission and reception of data between in-vehicle devices stops relay according to a traveling state of a vehicle when data received from a first communication unit or a second communication unit is fraudulent.

SUMMARY

In use of the in-vehicle relay device disclosed in JP-A-2019-022210, it is necessary to reliably detect the fraudulent received data. Therefore, in order to detect an attack from outside of the vehicle, it is common practice to install a firewall at a gateway that relays communication between the vehicle and the outside of the vehicle.

However, in order to protect the in-vehicle devices from attacks by unauthorized devices connected to the in-vehicle communication network, it is necessary to take measures such as encrypting the communication on the in-vehicle communication network in addition to performing predetermined authentication individually for each in-vehicle device to communicate on the in-vehicle communication network.

However, the number of the in-vehicle devices connected to the in-vehicle communication network is enormous. Moreover, the number and types of the in-vehicle devices that are actually connected to the in-vehicle communication network vary depending on vehicle type, grade, and presence or absence of various options. Therefore, if all the in-vehicle devices are equipped with an authentication function and an encrypted communication function, a cost of the in-vehicle system will increase significantly. It is also considered that an effective speed of communication between the in-vehicle devices may decrease due to authentication processing and encrypted communication.

The present disclosure has been made in view of the above circumstances, and an object thereof is to provide an in-vehicle system that can ensure safety against attacks by unauthorized devices without performing authentication processing or encrypted communication for an entire in-vehicle communication network.

An in-vehicle system including: an upper-level control unit configured to manage security of communication between a vehicle and an outside of the vehicle; one or more zone control units connected to the upper-level control unit via a first in-vehicle communication network, each of the one or more zone control units being configured to manage one zone on the vehicle; and a plurality of lower-level control units connected to a downstream side of each of the one or more zone control units via a second in-vehicle communication network, wherein each of the one or more zone control units includes: a power supply control unit configured to control power supply to each of the plurality of lower-level control units, a communication control unit configured to control communication with each of the plurality of lower-level control units, and an abnormality detection unit configured to detect presence or absence of an abnormality in each of the plurality of lower-level control units, wherein the abnormality detection unit is configured to monitor three or more elements including a power supply current value, a communication response time, and a MAC address for each of the plurality of lower-level control units, and wherein in a case in which an abnormality for two or more of the three or more elements is detected in at least one of the plurality of lower-level control units, the abnormality detection unit is configured to recognize that the at least one of the plurality of lower-level control units is an unauthorized device.

The present disclosure has been briefly described above. Details of the present disclosure will be further clarified by reading an aspect for implementing the present disclosure (hereinafter, referred to as an "embodiment") to be described below with reference to the accompanying drawings.

DETAILED DESCRIPTION

A specific embodiment according to the present disclosure will be described below with reference to the accompanying drawings.

<In-Vehicle System Configuration>

Figure 1:
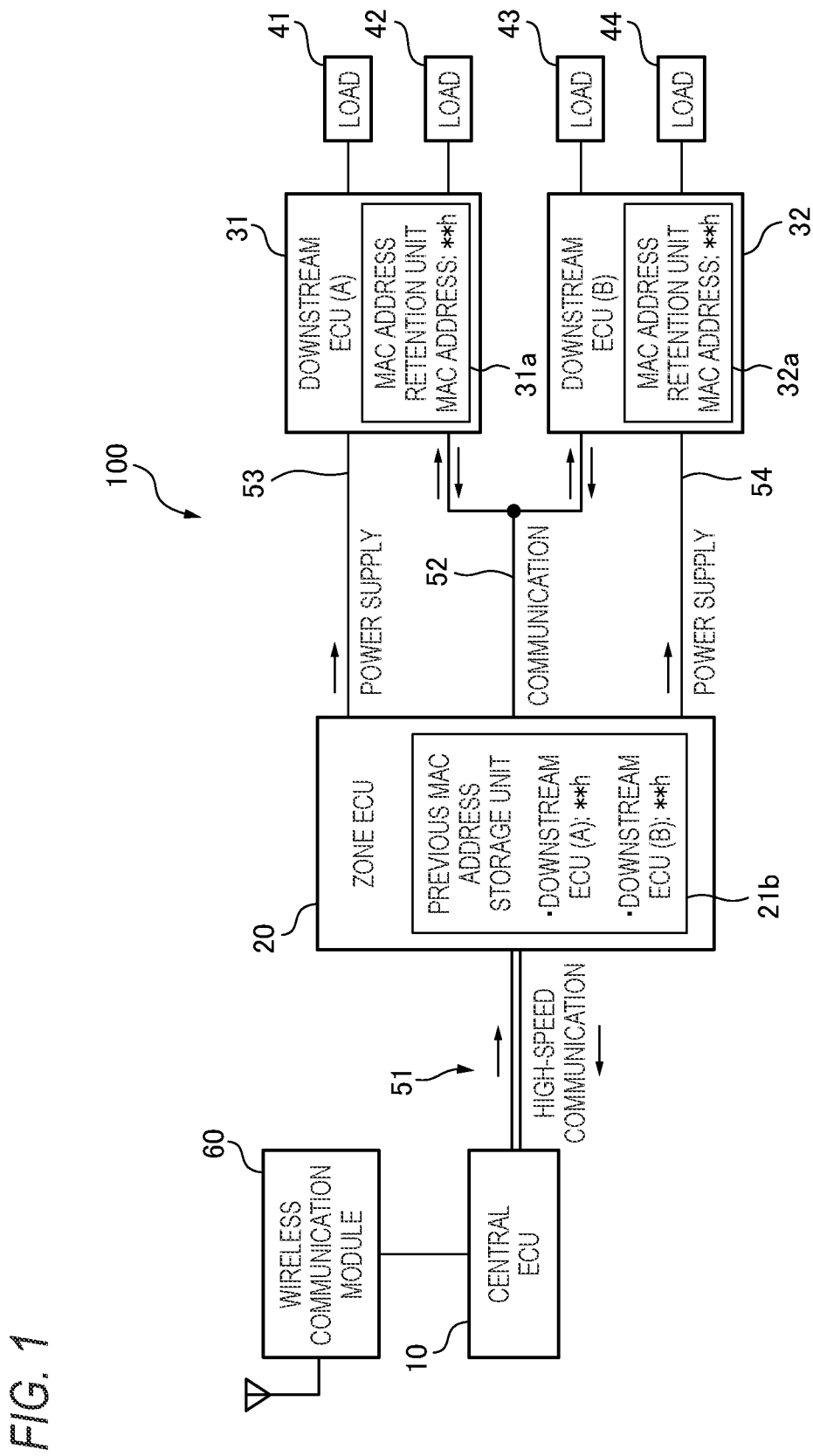
FIG. 1 is a block diagram showing a configuration of an in-vehicle system according to an embodiment of the present disclosure.

FIG. 1 is a block diagram showing a configuration of an in-vehicle system 100 according to an embodiment of the present disclosure.

The in-vehicle system 100 shown in FIG. 1 includes a central ECU 10, a zone ECU 20, downstream ECUs 31 and 32, loads 41, 42, 43, and 44, an upstream communication network 51, a downstream communication network 52, power supply lines 53 and 54, and a wireless communication module 60. For the purpose of convenience, FIG. 1 shows that the downstream ECU 31 is indicated as a "downstream ECU (A)" and the downstream ECU 32 is indicated as a "downstream ECU (B)".

The loads 41 to 44 correspond to various electrical components mounted as auxiliary devices on each part of a vehicle, such as lamps, horns, monitoring cameras, and air conditioners.

The downstream ECU 31 is equipped with a function necessary for controlling the loads 41, 42, and the like disposed at predetermined parts on the vehicle. The downstream ECU 31 is provided with a communication function for connecting to the downstream communication network 52, and a microcomputer. The downstream ECU 31 is further provided with a media access control (MAC) address retention unit 31a that retains information indicating a unique MAC address assigned in advance to the downstream ECU 31.

The downstream ECU 32 is equipped with a function necessary for controlling the loads 43, 44, and the like disposed at predetermined parts on the vehicle. The downstream ECU 32 is provided with a communication function for connecting to the downstream communication network 52, and a microcomputer. The downstream ECU 32 is further provided with a MAC address retention unit 32a that retains information indicating a unique MAC address assigned in advance to the downstream ECU 32.

The zone ECU 20 is designed to manage a certain zone on the vehicle. This zone means, for example, allocation of a specific area in space of the vehicle, allocation of a specific functional group, and the like. In an example shown in FIG. 1, the loads 41 to 44 are included in a zone managed by the zone ECU 20. Therefore, the downstream ECU 31 that controls the loads 41 and 42 and the downstream ECU 32 that controls the loads 43 and 44 are both connected to a downstream side of the zone ECU 20. That is, the downstream ECUs 31 and 32 are both under control of the zone ECU 20.

A downstream side of a communication system of the zone ECU 20 and an upstream side of a communication system of each of the downstream ECUs 31 and 32 are connected to the common downstream communication network 52. The downstream communication network 52 is controlled pursuant to a communication standard such as the Controller Area Network (CAN), and enables relatively low-speed data communication.

The power supply line 53 of the downstream ECU 31 is connected to one output of the zone ECU 20, and the power supply line 54 of the downstream ECU 32 is connected to another output of the zone ECU 20. That is, the zone ECU 20 can individually control power supply to the downstream ECU 31 and power supply to the downstream ECU 32.

The zone ECU 20 can individually perform data communication with the downstream ECUs 31 and 32 via the downstream communication network 52. When communicating with the downstream ECU 31, the zone ECU 20 can recognize the downstream ECU 31 by the unique MAC address of the downstream ECU 31 stored in the MAC address retention unit 31a. When communicating with the downstream ECU 32, the zone ECU 20 can recognize the downstream ECU 32 by the unique MAC address of the downstream ECU 32 stored in the MAC address retention unit 32a.

In order to store the MAC address of the downstream ECU 31 and the MAC address of the downstream ECU 32 that the zone ECU 20 knows, the zone ECU 20 includes a previous MAC address storage unit 21b. Although details will be described later, the zone ECU 20 can detect any attacks, unauthorized ECUs, and the like on a downstream side thereof by managing the MAC address and other information.

A smart actuator (not shown) may be connected to the downstream side of the zone ECU 20. Here, the smart actuator is equipped with a communication function for connecting to the downstream communication network 52, and is also capable of sending the information of the unique MAC address assigned thereto to the downstream communication network 52.

An upstream side of the communication system of the zone ECU 20 is connected to the central ECU 10 via the upstream communication network 51. The upstream communication network 51 is controlled pursuant to a communication standard such as the Ethernet (registered trademark), and enables relatively high-speed data communication.

The central ECU 10 manages a plurality of networks on the vehicle in an integrated manner, and also controls for safely connecting to a communication network such as the Internet outside the vehicle. In the in-vehicle system 100 shown in FIG. 1, the central ECU 10 is connected to the zone ECU 20 via the upstream communication network 51. The central ECU 10 can communicate with the outside of the vehicle via the wireless communication module 60.

The central ECU 10 has a function corresponding to general cyber security regarding communication on the upstream communication network 51 and communication with the outside of the vehicle. That is, functions such as firewall, key management, message authentication between upper-level ECUs, and encrypted communication are managed by the central ECU 10 or another upper-level ECU (not shown) on the upstream communication network 51.

<Zone ECU Configuration>

Figure 2:
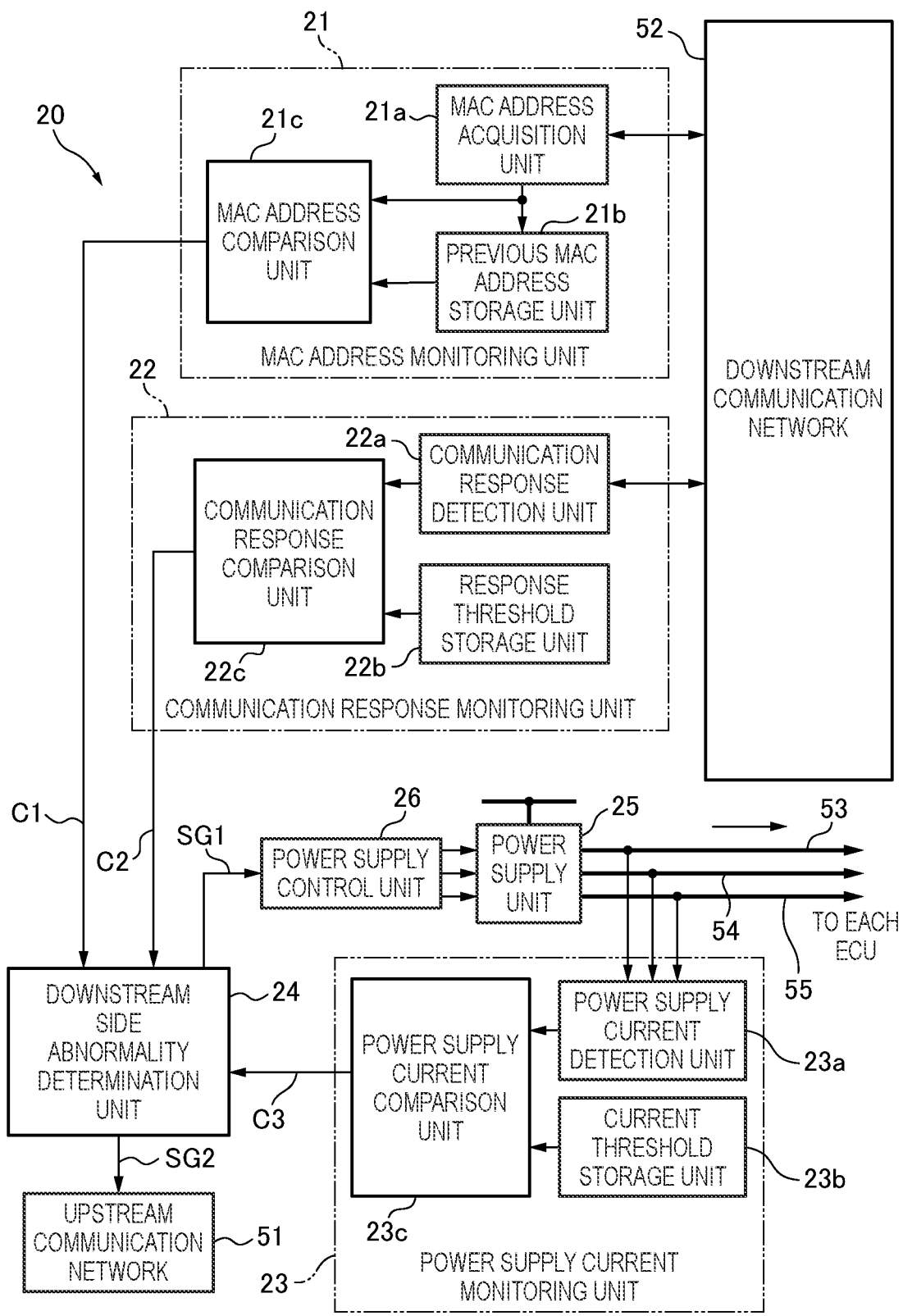
FIG. 2 is a block diagram showing a configuration of main units of a zone ECU.

FIG. 2 is a block diagram showing a configuration of main units of the zone ECU 20.

The zone ECU 20 shown in FIG. 2 includes a MAC address monitoring unit 21, a communication response monitoring unit 22, a power supply current monitoring unit 23, a downstream side abnormality determination unit 24, a power supply unit 25, and a power supply control unit 26. The zone ECU 20 includes, for example, a processor and a memory for storing instructions such as programs. When executed by the processor, the instructions may cause a computer to perform operations of at least one of the MAC address monitoring unit 21, the communication response monitoring unit 22, the power supply current monitoring unit 23, the downstream side abnormality determination unit 24, the power supply unit 25, and the power supply control unit 26.

The MAC address monitoring unit 21 includes a MAC address acquisition unit 21a, the previous MAC address storage unit 21b, and a MAC address comparison unit 21c. The MAC address acquisition unit 21a acquires the information indicating the MAC address from each of all the lower-level ECUs connected to the downstream side of the zone ECU 20 by communication via the downstream communication network 52.

The previous MAC address storage unit 21b has a function of storing information indicating previously acquired MAC address for each of all the lower-level ECUs connected to the downstream side of the zone ECU 20. The previous MAC address storage unit 21b is disposed on a non-volatile memory so that the information can be stored even when power supply to the zone ECU 20 is cut off.

The MAC address comparison unit 21c has a function of comparing the MAC address currently acquired by the MAC address acquisition unit 21a with the previous MAC address stored in the previous MAC address storage unit 21b for each of all the lower-level ECUs connected to the downstream side of the zone ECU 20. The MAC address comparison unit 21c outputs a comparison result C1 of each lower-level ECU to the downstream side abnormality determination unit 24.

The communication response monitoring unit 22 includes a communication response detection unit 22a, a response threshold storage unit 22b, and a communication response comparison unit 22c.

The communication response detection unit 22a has a function of measuring time required from transmission of data by the zone ECU 20 to reception of a response from each lower-level ECU as a communication response for each of all the lower-level ECUs connected to the downstream side of the zone ECU 20.

The response threshold storage unit 22b stores data indicating a communication response threshold (set value) for each of all the lower-level ECUs connected to the downstream side of the zone ECU 20. The response threshold storage unit 22b is disposed on a non-volatile memory so as to enable storage of information even when the power supply to the zone ECU 20 is cut off.

The communication response comparison unit 22c has a function of comparing a length of the communication response time measured by the communication response detection unit 22a with the threshold stored in the response threshold storage unit 22b for each of all the lower-level ECUs connected to the downstream side of the zone ECU 20. The communication response comparison unit 22c outputs a comparison result C2 of each lower-level ECU to the downstream side abnormality determination unit 24.

The power supply current monitoring unit 23 includes a power supply current detection unit 23a, a current threshold storage unit 23b, and a power supply current comparison unit 23c.

The power supply unit 25 can supply power to each lower-level ECU via any of a plurality of power supply lines 53, 54, and 55. Therefore, magnitudes of a power supply current and power consumed by each lower-level ECU can be understood from currents flowing through the power supply lines 53, 54, and 55.

The power supply current detection unit 23a detects the current flowing through each of the plurality of power supply lines 53, 54, and 55, and understands the magnitude of the power supply current flowing through each lower-level ECU. Actually, an average current magnitude when a current continuously flows through each of the power supply lines 53, 54, and 55 is detected.

The current threshold storage unit 23b stores data indicating a power supply current threshold (set value) for each of all the lower-level ECUs connected to the downstream side of the zone ECU 20. The current threshold storage unit 23b is disposed on a non-volatile memory so as to enable storage of information even when the power supply to the zone ECU 20 is cut off.

The power supply current comparison unit 23c has a function of comparing the magnitude of the power supply current detected by the power supply current detection unit 23a with the threshold stored in the current threshold storage unit 23b for each of all the lower-level ECUs connected to the downstream side of the zone ECU 20. The power supply current comparison unit 23c outputs a comparison result C3 of each lower-level ECU to the downstream side abnormality determination unit 24.

The downstream side abnormality determination unit 24 individually determines presence or absence of an abnormality for each of all the lower-level ECUs connected to the downstream side of the zone ECU 20 based on the comparison result C1 of the MAC address monitoring unit 21, the comparison result C2 of the communication response monitoring unit 22, and the comparison result C3 of the power supply current monitoring unit 23.

When an abnormality is detected, the downstream side abnormality determination unit 24 outputs a power control signal SG1 to the power supply control unit 26, and controls the power supply unit 25 to cut off power supply to the lower-level ECU in which the abnormality is detected. The downstream side abnormality determination unit 24 notifies the central ECU 10 of information of the lower-level ECU in which the abnormality is detected by an abnormality notification signal SG2 via the upstream communication network 51.

<Operations of Zone ECU>

Figure 3:
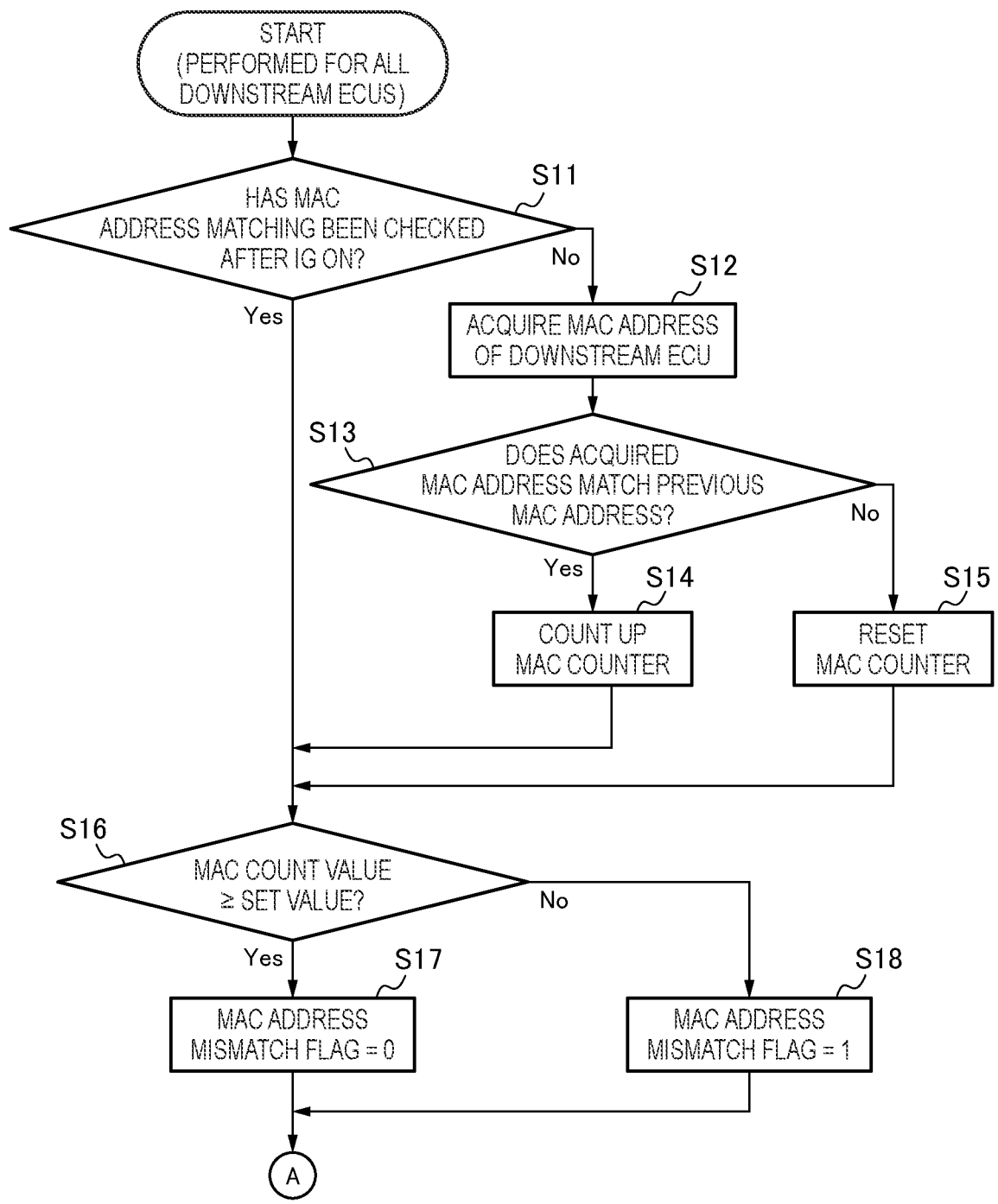
FIG. 3 is a flowchart showing a part of main operations of the zone ECU.
Figure 4:
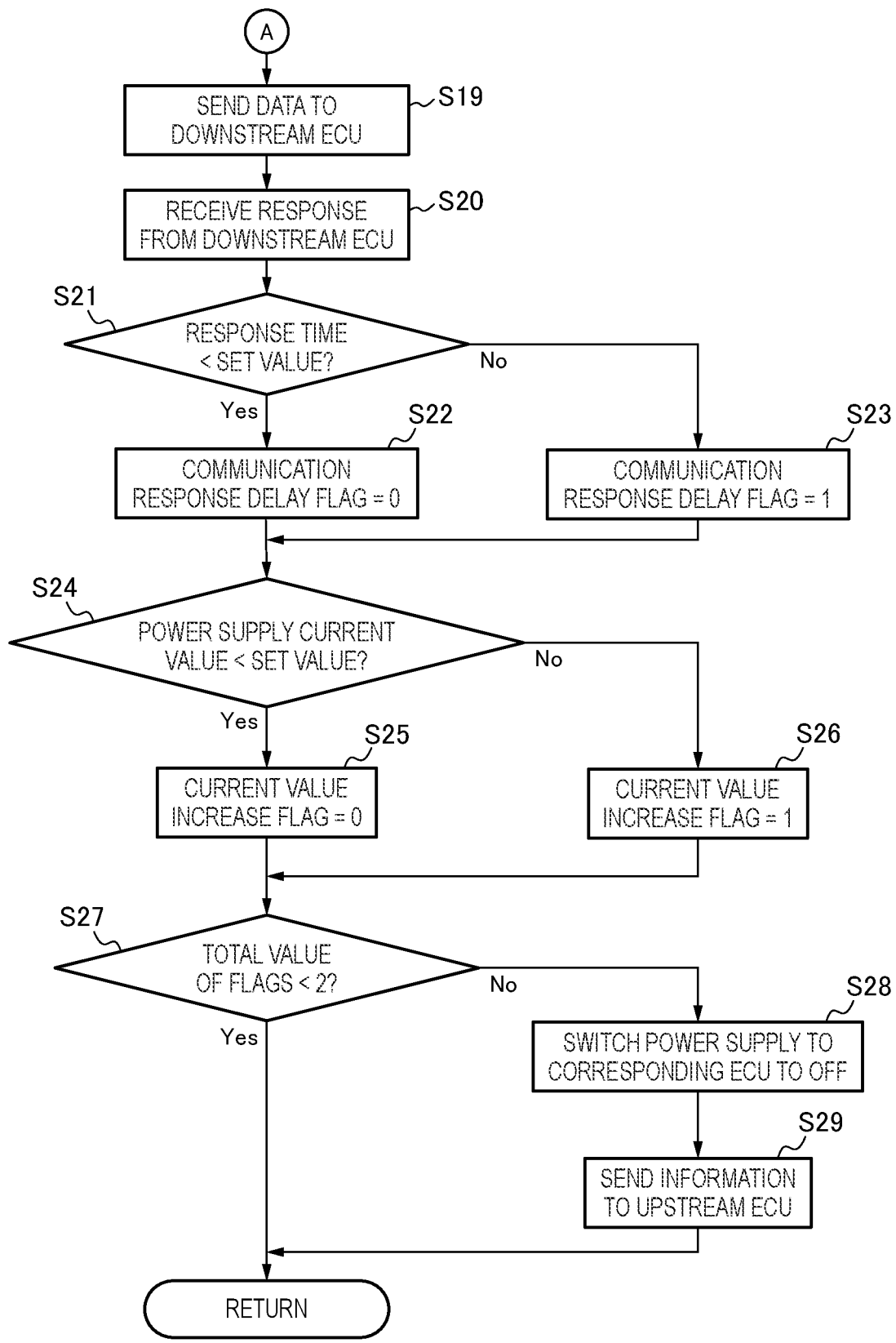
FIG. 4 is a flowchart showing remaining parts of the main operations of the zone ECU.

Main operations in the zone ECU 20 are shown in FIGS. 3 and 4. Operations shown in FIGS. 3 and 4 are individually performed for both the downstream ECUs 31 and 32 connected to the downstream communication network 52 on the downstream side of the zone ECU 20. The operations shown in FIGS. 3 and 4 are repeatedly executed in a predetermined time cycle.

In the following description, a case where the zone ECU 20 checks for presence or absence of an abnormality in the downstream ECU 31 shown in FIG. 1 will be described as an example.

The zone ECU 20 checks MAC address matching for each lower-level ECU only once after ignition (IG) of the vehicle is switched from off to on (S11). If the checking has been performed, the process proceeds from S11 to S16. If the checking has not been performed, the process proceeds from S11 to S12 to check the MAC address matching.

The MAC address acquisition unit 21a of the zone ECU 20 communicates with the corresponding downstream ECU 31 via the downstream communication network 52, and acquires information of the MAC address of the downstream ECU 31 (S12). The information of the MAC address is constituted by data of 48 bits, that is, 6 bytes, as a whole, but it is not always necessary to acquire the whole information. For example, only lower 8 bits (1 byte) of the MAC address may be acquired in S12. The information of the MAC address is repeatedly acquired from the same downstream ECU 31 for a predetermined number of times, for example, 16 times in S12.

The MAC address comparison unit 21c of the zone ECU 20 compares a value of the MAC address currently acquired from the downstream ECU 31 with a value of the previous MAC address stored in the previous MAC address storage unit 21b, and identifies whether the values match each other in S13.

The MAC address comparison unit 21c includes a MAC counter that counts the number of times that the matching of MAC addresses is compared. The MAC address comparison unit 21c counts up the MAC counter in S14 every time a MAC address match is detected in S13. If mismatch of the MAC addresses is detected in S13, the MAC counter is reset in S15.

The MAC address comparison unit 21c compares a value of the MAC counter with a predetermined set value, for example, "16" in S16. Then, if the value of the MAC counter is equal to or greater than the set value, the process proceeds to S17, and if the value is less than the set value, the process proceeds to S18.

For example, when the MAC addresses of the downstream ECU 31 acquired in S12 do not match each other for 16 times in a row, the zone ECU 20 proceeds from S16 to S17, and the MAC address comparison unit 21c clears an "MAC address mismatch flag" to "0".

When the mismatch of the MAC addresses of the downstream ECU 31 acquired in S12 is detected even once, the zone ECU 20 proceeds from S16 to S18, and the MAC address comparison unit 21c sets the "MAC address mismatch flag" to "1".

The "MAC address mismatch flag" is output to the downstream side abnormality determination unit 24 for each lower-level ECU as a comparison result C1 in FIG. 2.

The communication response detection unit 22a of the zone ECU 20 transmits predetermined data to the downstream ECU 31 in S19 as shown in FIG. 4. Immediately after that, a response from the downstream ECU 31 is received (S20). In this way, a response time from transmission of data by the communication response detection unit 22a to returning of a response from a transmission destination can be measured for each lower-level ECU.

The communication response comparison unit 22c of the zone ECU 20 compares the response time of the downstream ECU 31 measured in S19 and S20 with a set value stored in the response threshold storage unit 22b (S21). Then, if a condition of S21 is satisfied, the communication response comparison unit 22c clears a "communication response delay flag" of the downstream ECU 31 to "0" in S22. If the condition of S21 is not satisfied, the "communication response delay flag" of the downstream ECU 31 is set to "1" in S23. The "communication response delay flag" is output to the downstream side abnormality determination unit 24 for each lower-level ECU as a comparison result C2 in FIG. 2.

The power supply current detection unit 23a of the zone ECU 20 measures a power supply current flowing through the power supply line 53 to which the downstream ECU 31 to be inspected is connected, and the power supply current comparison unit 23c compares a current value measured by the power supply current detection unit 23a with a set current value stored in the current threshold storage unit 23b (S24).

When a condition of S24 is satisfied, the zone ECU 20 proceeds to S25, and the power supply current comparison unit 23c clears a "current value increase flag" of the downstream ECU 31 to "0". When the condition of S24 is not satisfied, the power supply current comparison unit 23c sets the "current value increase flag" of the downstream ECU 31 to "1" in S26.

The "current value increase flag" is output to the downstream side abnormality determination unit 24 for each lower-level ECU as a comparison result C3 in FIG. 2.

The downstream side abnormality determination unit 24 calculates a total value of the above-mentioned "MAC address mismatch flag", "communication response delay flag", and "current value increase flag" for each lower-level ECU based on the comparison results C1, C2, and C3, and compares the total value with "2" (S27).

When a plurality of flags are set at the same time, that is, when the total value of the flags is 2 or more in S27, it is considered that the downstream side abnormality determination unit 24 detects an abnormality and the process proceeds to S28. Therefore, when an abnormality in the downstream ECU 31 is detected, the downstream abnormality determination unit 24 controls the power control signal SG1 in S28 so as to cut off the power supply to the power supply line 53 connected to the downstream ECU 31. The downstream side abnormality determination unit 24 notifies the central ECU 10 via the upstream side communication network 51 that an abnormality occurs in the downstream ECU 31 (S29).

<Relation Between Detected Event and Attack by Unauthorized ECU>

Next, a relation between a detected abnormal event and an attack by an unauthorized ECU will be described.
(1) Detection of Increase in Current Consumption in Each Lower-Level ECU
  (1a) Case Under Cyber Attack:
  By an unauthorized program operating on a corresponding lower-level ECU, power consumption is increased on average as compared with before the attack.
  (1b) Case not Under Cyber Attack:
  In order to add functions, new auxiliary devices (actuators and the like) are attached to the corresponding lower-level ECU, and the power consumption is increased on average.
(2) Detection of Communication Response Decrease in Each Lower-Level ECU
  (2a) Case Under Cyber Attack:
  As an unauthorized program operates on a corresponding lower-level ECU and the number of processing increases, a delay occurs in processing of a regular communication operation, and a communication response is decreased.
  (2b) Case not Under Cyber Attack:
  Temporary decrease of communication response occurs in each lower-level ECU due to noise or the like.
(3) Detection of MAC Address Mismatch of Each Lower-Level ECU
  (3a) Case Under Cyber Attack:
  A corresponding lower-level ECU is replaced with an unauthorized ECU from an authorized ECU.
  (3b) Case not Under Cyber Attack:
  In order to deal with a failure or the like, a predetermined registration work is not performed after the lower-level ECU is replaced with an authorized ECU by a non-authorized dealer.

Therefore, even when any of the above-mentioned abnormalities (1), (2), and (3) is detected, it is not possible to determine whether or not the corresponding lower-level ECU is under attack. However, when a plurality of the above (1), (2), and (3) occur at the same time, it is highly probable that the corresponding lower-level ECU is under a cyber attack.

That is, when two or more flag abnormalities are simultaneously detected for the same lower-level ECU in S27 shown in FIG. 4, by processing in S28 and S29 so that the zone ECU 20 excludes the corresponding lower-level ECU from the in-vehicle system 100, safety against the cyber attack can be ensured. Moreover, since it is not necessary to add a function of authenticating each lower-level ECU or a function of encrypting communication to the downstream communication network 52 whose end is connected to a large number of lower-level ECUs, cost increase of the entire system is prevented and it is easy to ensure safety.

Modified Example

Figure 5:
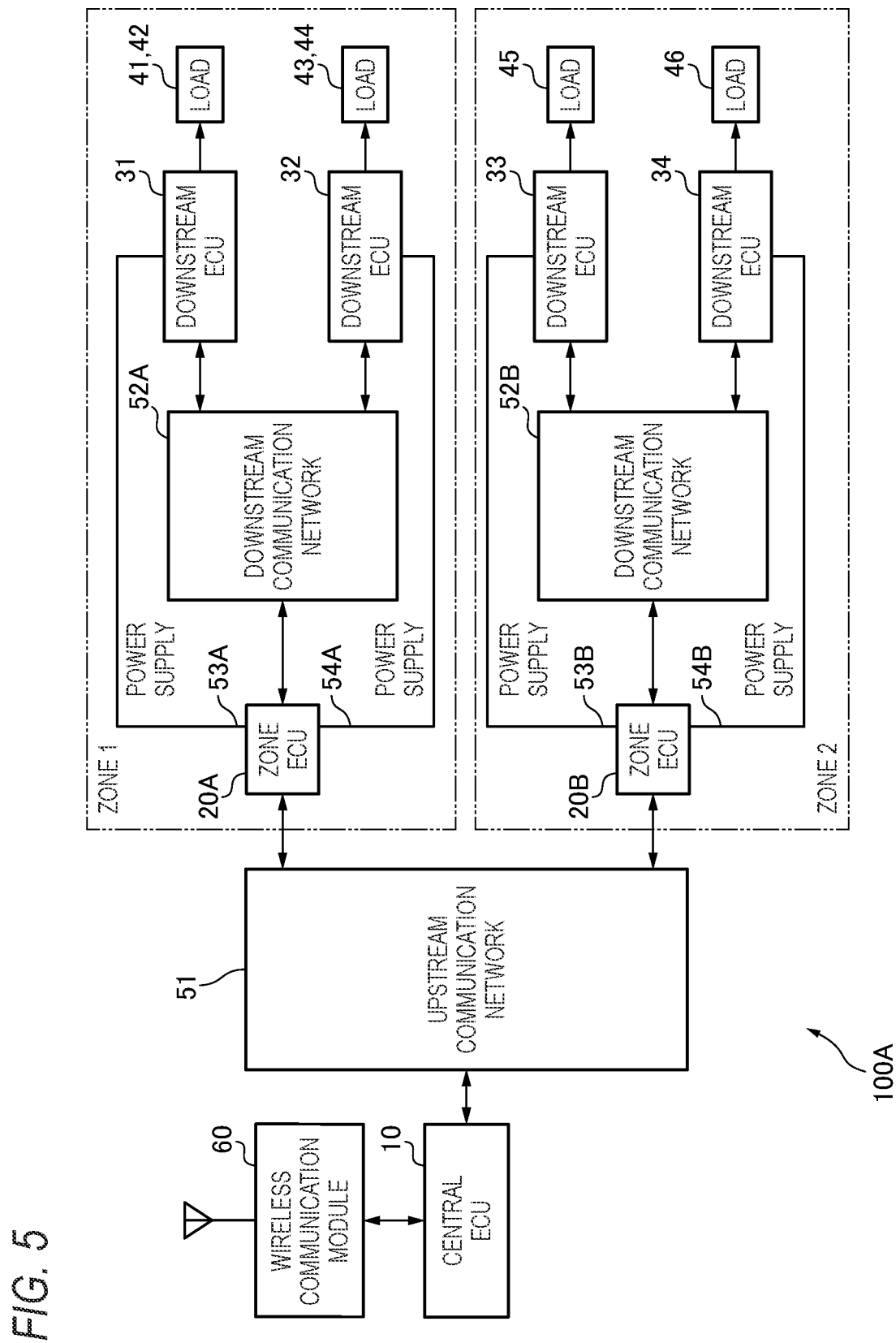
FIG. 5 is a block diagram showing a configuration of a modified example of an in-vehicle system.

FIG. 5 is a block diagram showing a configuration of a modified example of an in-vehicle system 100A.

In the in-vehicle system 100A shown in FIG. 5, zones 1 and 2 on the same vehicle are managed by independent zone ECUs 20A and 20B, respectively. The zone ECUs 20A and 20B are connected to the central ECU 10 via the upstream communication network 51, respectively.

In the zone 1 shown in FIG. 5, the loads 41 and 42 are connected to the downstream ECU 31, and the loads 43 and 44 are connected to the downstream ECU 32. The two downstream ECUs 31 and 32 are both connected to a zone ECU 20A via a downstream communication network 52A. A power supply line 53A of the downstream ECU 31 and a power supply line 54A of the downstream ECU 32 are connected to the zone ECU 20A, respectively.

In the zone 2 shown in FIG. 5, a load 45 is connected to a downstream ECU 33, and a load 46 is connected to a downstream ECU 34. The two downstream ECUs 33 and 34 are both connected to a zone ECU 20B via a downstream communication network 52B. A power supply line 53B of the downstream ECU 33 and a power supply line 54B of the downstream ECU 34 are connected to the zone ECU 20B, respectively.

Configurations and operations of the two zone ECUs 20A and 20B shown in FIG. 5 are the same as those of the zone ECU 20 shown in FIG. 1. Therefore, the zone ECU 20A can ensure safety against attacks by the downstream ECUs 31 and 32 in the zone 1. The zone ECU 20B can ensure safety against attacks by the downstream ECUs 33 and 34 in the zone 2.

The embodiment of the present disclosure provides an in-vehicle system, the system including: an upper-level control unit (for example, the central ECU 10) configured to manage security of communication between a vehicle and an outside of the vehicle; one or more zone control units (for example, the zone ECU 20) connected to the upper-level control unit via a first in-vehicle communication network (for example, the upstream communication network 51), each of the one or more zone control units being configured to manage one zone on the vehicle; and a plurality of lower-level control units (for example, the downstream ECUs 31 and 32) connected to a downstream side of each of the one or more zone control units via a second in-vehicle communication network (for example, the downstream communication network 52), in which each of the one or more zone control units includes: a power supply control unit (for example, the power supply control unit 26) configured to control power supply to each of the plurality of lower-level control units; a communication control unit (for example, the MAC address monitoring unit 21 and the communication response monitoring unit 22) configured to control communication with each of the plurality of lower-level control units; and an abnormality detection unit (for example, the downstream side abnormality determination unit 24) configured to detect presence or absence of an abnormality in each of the plurality of lower-level control units, in which the abnormality detection unit is configured to monitor three or more elements including a power supply current value, a communication response time, and a MAC address for each of the plurality of lower-level control units, and in which in a case in which an abnormality for two or more of the three or more elements is detected in at least one of the plurality of lower-level control units (S27), the abnormality detection unit is configured to recognize that the at least one of the plurality of lower-level control units is an unauthorized device.

According to this configuration, presence or absence of an unauthorized device connected to the second in-vehicle communication network can be detected without performing authentication processing or communication encryption processing for each lower-level control unit on the second in-vehicle communication network. Therefore, security of the in-vehicle system can be ensured against an attack from the unauthorized device on the second in-vehicle communication network without any large cost increase. Moreover, when a plurality of abnormalities of the element are detected, the abnormality detecting unit recognizes the corresponding lower-level control unit to be unauthorized, so that the unauthorized device and authorized devices can be discriminated with high accuracy.

The one or more zone control units include a first zone control unit (for example, the zone ECU 20A) and a second zone control unit (for example, the zone ECU 20B), each of the first control unit and the second zone control unit being connected to the upper-level control unit (for example, the central ECU 10) via the first in-vehicle communication network (for example, the upstream communication network 51). The plurality of first lower-level control units include a plurality of first lower-level control units (for example, the downstream ECUs 31 and 32) allocated to a first zone (for example, the zone 1) and a plurality of second lower-level control units (for example, the downstream ECU 33 and 34) allocated to a second zone (for example, the zone 2). The plurality of first lower-level control units are connected to a downstream side of the first zone control unit, and the plurality of second lower-level control units are connected to a downstream side of the second zone control unit. The first zone control unit is configured to detect a security abnormality related to the plurality of first lower-level control units, and the second zone control unit is configured to detect a security abnormality related to the plurality of second lower-level control units.

According to this configuration, each of the plurality of zones on the vehicle can be managed by a plurality of independent zone control units, so that proper control of the in-vehicle system is easy. For example, when the in-vehicle system includes the first zone control unit and the second zone control unit, a large number of the lower-level control units on the in-vehicle system can be distributed and connected to the two zone control units. Therefore, even if a communication speed of the second in-vehicle communication network is relatively low, each zone control unit can recognize all states of the plurality of lower-level control units to be managed in a short time and can control without causing a large delay.

The first in-vehicle communication network (for example, the upstream communication network 51) is controlled pursuant to a first communication standard, and the second in-vehicle communication network (for example, the second in-vehicle communication network 52) is controlled pursuant to a second communication standard supporting a transmission speed lower than that of the first communication standard.

According to this configuration, communication between an inside and the outside of the vehicle and communication between a plurality of zones on the vehicle can be performed at a high speed. By using a highly versatile communication standard such as the Ethernet (registered trademark) in the first in-vehicle communication network, it is easy to build a firewall or the like using various existing techniques and ensure security. By using a communication standard suitable for in-vehicle devices such as the CAN in the second in-vehicle communication network, it is easy to connect a large number of in-vehicle devices at a low cost.

The one or more zone control units (for example, the zone ECU 20) are configured to monitor all of the plurality of lower-level control units (for example, the downstream ECUs 31 and 32) connected to the downstream sides of the one or more zone control units via the second in-vehicle communication network.

According to this configuration, since all the lower-level control units connected to the downstream side are monitored, it is easy to ensure the safety of the in-vehicle system. For example, even if the unauthorized device is connected to the downstream side as an unregistered device, or even if the unauthorized device is mistakenly connected to the downstream side as a registered legitimate device, the unauthorized device can be monitored by the zone control unit.

In response to recognition of the unauthorized device, each of the one or more zone control units is configured to cut off power supply to the at least one of the plurality of lower-level control units recognized (S28), and notify the upper-level control unit of occurrence of the unauthorized device (S29).

According to this configuration, since the power supply to the device detected to be unauthorized is cut off, it is possible to avoid attacks by the unauthorized device thereafter. Since the upper-level control unit can know existence of the unauthorized device, it is easy to ensure the safety of the in-vehicle system. For example, it is possible for the upper-level control unit to block communication from the unauthorized device to the outside of the vehicle and communication in an opposite direction thereof.

According to the in-vehicle system of the present disclosure, it is easy to ensure the safety against the attacks by the unauthorized device without performing authentication processing or encrypted communication for the entire in-vehicle communication network. Therefore, a cost of security measures can be significantly reduced.

The invention claimed is:

1. An in-vehicle system comprising:
    an upper-level control unit configured to manage security of communication between a vehicle and an outside of the vehicle;
    one or more zone control units connected to the upper-level control unit via a first in-vehicle communication network, each of the one or more zone control units being configured to manage one zone on the vehicle; and
    a plurality of lower-level control units connected to a downstream side of each of the one or more zone control units via a second in-vehicle communication network,
    wherein each of the one or more zone control units comprises:
        a power supply control unit configured to control power supply to each of the plurality of lower-level control units;
        a communication control unit configured to control communication with each of the plurality of lower-level control units; and
        an abnormality detection unit configured to detect presence or absence of an abnormality in each of the plurality of lower-level control units,
    wherein the abnormality detection unit is configured to monitor three or more elements including a power supply current value, a communication response time, and a MAC address for each of the plurality of lower-level control units, and
    wherein in a case in which an abnormality for two or more of the three or more elements is detected in at least one of the plurality of lower-level control units, the abnormality detection unit is configured to recognize that the at least one of the plurality of lower-level control units is an unauthorized device.

2. The in-vehicle system according to claim 1,
    wherein the one or more zone control units comprise a first zone control unit and a second zone control unit, each of the first zone control unit and the second zone control unit being connected to the upper-level control unit via the first in-vehicle communication network,
    wherein the plurality of lower-level control units comprise a plurality of first lower-level control units allocated to a first zone and a plurality of second lower-level control units allocated to a second zone,
    wherein the plurality of first lower-level control units are connected to a downstream side of the first zone control unit,
    wherein the plurality of second lower-level control units are connected to a downstream side of the second zone control unit,
    wherein the first zone control unit is configured to detect a security abnormality related to the plurality of first lower-level control units, and
    wherein the second zone control unit is configured to detect a security abnormality related to the plurality of second lower-level control units.

3. The in-vehicle system according to claim 1,
    wherein the first in-vehicle communication network is controlled pursuant to a first communication standard, and
    wherein the second in-vehicle communication network is controlled pursuant to a second communication standard supporting a transmission speed lower than that of the first communication standard.

4. The in-vehicle system according to claim 1,
    wherein the one or more zone control units are configured to monitor all of the plurality of lower-level control units connected to the downstream sides of the one or more zone control units via the second in-vehicle communication network.

5. The in-vehicle system according to claim 1,
    wherein in response to recognition of the unauthorized device, each of the one or more zone control units is configured to cut off power supply to the at least one of the plurality of lower-level control units recognized as the unauthorized device, and notify the upper-level control unit of occurrence of the unauthorized device.

* * * * *